(12) United States Patent
Robb (10) Patent No.: US 7,172,638 B2
(45) Date of Patent: Feb. 6, 2007

(54) STAGED AIR AUTOTHERMAL REFORMER FOR IMPROVED STARTUP AND OPERATION

(75) Inventor: Gary M. Robb, Lima, NY (US)

(73) Assignee: General Motors Corporation, Detroit, MI (US)

( * ) Notice: Subject to any disclaimer, the term of this patent is extended or adjusted under 35 U.S.C. 154(b) by 350 days.

(21) Appl. No.: 10/134,992

(22) Filed: Apr. 29, 2002

(65) Prior Publication Data

US 2003/0200699 A1 Oct. 30, 2003

(51) Int. Cl.
*C10J 3/00* (2006.01)
*B01J 8/02* (2006.01)
(52) U.S. Cl. .............. 48/214 A; 48/214 R; 48/215; 48/127.9; 422/220; 422/222
(58) Field of Classification Search ............ 48/61, 48/62 R, 63, 89, 93–95, 127.9, 211, 198.1, 48/212, 198.7, 213, 214 A, 215, 214 R, 102 A; 422/105, 107, 110, 111, 115, 211, 189–191, 422/193–195, 220, 222, 179, 200, 213, 221, 422/202
See application file for complete search history.

(56) References Cited

U.S. PATENT DOCUMENTS

| | | | |
|---|---|---|---|
| 3,481,722 A | 12/1969 | Pfefferle | |
| 4,024,912 A * | 5/1977 | Hamrick et al. ............ | 166/57 |
| 4,650,727 A | 3/1987 | Vanderborgh et al. | |
| 5,248,566 A | 9/1993 | Kumar et al. | |
| 5,271,916 A | 12/1993 | Vanderborgh et al. | |
| 5,637,415 A | 6/1997 | Meltser et al. | |
| 5,690,902 A | 11/1997 | Werth | |
| 5,874,051 A | 2/1999 | Heil et al. | |
| 5,883,138 A * | 3/1999 | Hershkowitz et al. ...... | 518/703 |
| 6,077,620 A | 6/2000 | Pettit | |
| 6,123,873 A * | 9/2000 | Primdahl ................ | 252/376 |
| 6,232,005 B1 | 5/2001 | Pettit | |
| 6,818,198 B2 * | 11/2004 | Singh et al. ............. | 423/652 |
| 2003/0200699 A1 * | 10/2003 | Robb ..................... | 48/198.7 |
| 2004/0194383 A1 * | 10/2004 | Wheat et al. ............ | 48/197 R |
| 2005/0227130 A1 * | 10/2005 | Ahluwalia et al. ......... | 429/20 |
| 2005/0239909 A1 * | 10/2005 | Arcuri et al. ............ | 518/703 |
| 2005/0245620 A1 * | 11/2005 | Shi et al. ................ | 518/716 |
| 2005/0257427 A1 * | 11/2005 | Zhao et al. ............. | 48/198.7 |

FOREIGN PATENT DOCUMENTS

| | | | |
|---|---|---|---|
| EP | 0 936 182 | * | 8/1999 |
| WO | WO 9600267 A1 * | | 1/1996 |
| WO | WO 2004/043587 | * | 5/2004 |
| WO | WO 2005-070818 | * | 8/2005 |

* cited by examiner

*Primary Examiner*—N. Bhat
(74) *Attorney, Agent, or Firm*—Harness, Dickey & Pierce, P.L.C.

(57) ABSTRACT

An autothermal reformer according to the principles of the present invention comprises a first stage that selectively receives a fuel flow, a first oxidant flow, and a steam flow. The first stage has a first portion of a catalyst bed. The fluids within the first stage are routed through the first portion of the catalyst bed and react. There is a second stage downstream from and communicating with the first stage. The second stage receives the fluids from the first stage and also selectively receives a second oxidant flow. The second oxidant flow and the fluids received from the first stage flow through a second portion of a catalyst bed and further react.

20 Claims, 3 Drawing Sheets

STAGED AIR AUTOTHERMAL REFORMER FOR IMPROVED STARTUP AND OPERATION

FIELD OF THE INVENTION

The present invention relates to autothermal reformers that convert a fuel into hydrogen and, more specifically, to autothermal reformers that use an oxidant along with steam to convert the fuel to hydrogen.

BACKGROUND OF THE INVENTION

Conventional autothermal reformers introduce reactants (fuel, oxidants, steam, etc.) into the front of the reformer and allow the associated reactions to occur to completion as the reactants flow through the reformer. The fuel can come in a variety of forms, such as methanol, gasoline, ethanol, etc. The oxidant is typically provided in the form of oxygen ($O_2$) or air ($O_2$ mixed with $N_2$). The steam is typically superheated steam which supplies heat and water to the reformer. The superheated steam can be mixed with the oxidant flow prior to entering the reformer. The reformer converts these reactants into hydrogen ($H_2$), carbon monoxide (CO), methane ($CH_4$), carbon dioxide ($CO_2$), and water ($H_2O$). The reformer can be used as a fuel source for supplying $H_2$ to a fuel cell that uses the $H_2$ as an anode reactant that, in conjunction with a cathode reactant produces electricity. The reformer can also be used to produce $H_2$ that is then stored until the $H_2$ is needed, such as at an $H_2$ production facility.

During the startup of the reformer, and of the system within which the reformer is operating, superheated steam may not be readily available. Therefore, during startup the typical reformer will use the fuel and the oxidant in conjunction with a catalyst to perform a catalytic partial oxidation reaction until superheated steam is available. For example, when methane is used as the fuel, the catalytic partial oxidation reaction is as follows:

$CH_4 + \frac{1}{2}O_2 \rightarrow CO + 2H_2$, which has a $\Delta H = -247$ $KJmol^{-1}$.

As can be seen, the catalytic partial oxidation is an exothermic reaction that generates a large amount of heat. As a result, the large amount of heat generated by the catalytic partial oxidation reaction can cause damage to the components within the reformer. The catalytic partial oxidation reaction can also cause hot spots to occur within the catalyst beds or within the reformer that can damage the catalyst bed and/or the reformer. Therefore, it is desirable to control the temperature within the reformer as a result of the catalytic partial oxidation reaction.

Another concern during the startup of the reformer is the formation of carbon within the reformer. Carbon formation in the reformer can quickly plug the catalyst bed and cause additional damage to the reformer. Carbon formation occurs when there is insufficient oxidant for the carbon molecule to bind with during the catalytic partial oxidation reaction. For example, when there is an insufficient amount of oxidant, and the temperature is high, a pyrolysis reaction can occur according to the following formula:

$CH_4 \rightarrow C + 2H_2$, which has a $\Delta H = 75$ $KJmol^{-1}$.

A disproportionation of CO can also occur in the form of a Boudouard reaction. The Boudouard reaction is as follows:

$2CO \rightarrow C + CO_2$.

The Boudouard reaction is catalyzed by metal, such as nickel, and, therefore, there is a high risk of the Boudouard reaction occurring in a reformer that uses a nickel or nickel containing catalyst or a nickel containing stainless steel in the reformer vessel. The risk of carbon formation is greatest during the startup because once steam is available and is added to reformer, the steam promotes the following steam reforming and shift reactions:

$CH_4 + H_2O \rightarrow CO + 3 H_2$, with a $\Delta H = 250$ $KJmol^{-1}$, $CO + H_2O \rightarrow CO_2 + H_2$, with a $\Delta H = -41$ $KJmol^{-1}$, which has the effect of reducing the partial pressure of carbon monoxide in the fuel gas stream. Steam also leads to the carbon gasification reaction, as follows:

$C + H_2O \rightarrow CO + H_2$.

Therefore, the risk of carbon formation is greatest during the startup operation when steam is not available and/or limited. In order to avoid carbon formation, oxidant can be supplied in a ratio sufficient to avoid carbon formation due to the lack of steam. An oxygen to carbon ratio (O/C ratio) of at least 1.0 is needed to avoid carbon formation (if all carbon exits the reformer in the form of CO). Since some level of $CO_2$ is favored by thermodynamic equilibrium, a higher O/C ratio is actually required, such as 1.1 or greater. However, such a high O/C ratio can cause a prohibitively high temperature in the reformer due to the catalytic partial oxidation reaction. The prohibitively high is most prone to occur at the front end of the reformer where the oxidant and fuel are fed into the reformer; however, prohibitively high temperature can be experienced throughout the length of the reformer.

Therefore, there exists a need to control the temperature that occurs within the reformer during startup while also providing an O/C ratio that is sufficient to prevent carbon formation within the reformer. Additionally, it is desirable to provide a reformer that has a more uniform temperature distribution along its length to increase the lifespan of the reformer and catalyst bed along with increasing the conversion of the fuel to $H_2$.

SUMMARY OF THE INVENTION

An autothermal reformer according to the principles of the present invention provides for control of the temperature within the reformer while preventing carbon formation. This is accomplished by staging the introduction of the oxidant along the reformer so that the oxidant is injected in multiple locations along its length.

An autothermal reformer according to the principles of the present invention comprises a first stage that receives a fuel flow, a first oxidant flow, and a steam flow. The first stage contains a first portion of a catalyst bed. The first stage routes fluids within the first stage through the first portion of the catalyst bed. There is a second stage downstream and communicating with the first stage. The second stage receives fluids that were routed through the first portion of the catalyst bed. The second stage also receives a second oxidant flow. The second stage contains a second portion of the catalyst bed. The second stage routes fluids received by the second stage through the second portion of the catalyst bed.

The present invention also discloses a method of starting up an autothermal reformer. The method includes the steps of: 1) selectively supplying a fuel flow to a first stage of the reformer; 2) selectively supplying a first oxidant flow to the first stage of the reformer; 3) routing fluid within the first stage of the reformer through a first portion of a catalyst bed and into a second stage of the reformer that is downstream from the first stage; 4) catalytically reacting the fluid within the first stage as the fluid flows through the first portion of the catalyst bed; 5) selectively supplying a second oxidant flow to the second stage of the reformer; 6) routing fluid within the second stage of the reformer through a second portion of the catalyst bed; and 7) catalytically reacting the fluid within the second stage as the fluid within the second stage flows through the second portion of the catalyst bed.

Additionally, the present invention also discloses a method of operating an autothermal reformer. The method includes the steps of: 1) supplying fuel flow to a first stage of the reformer; 2) selectively supplying a steam flow to the first stage of the reformer; 3) selectively supplying a first oxidant flow to the first stage of the reformer; 4) routing fluid within the first stage of the reformer through a first portion of a catalyst bed and into a second stage of the reformer that is downstream from the first stage; 5) catalytically reacting the fluid within the first stage as the fluid flows through the first portion of the catalyst bed; 6) selectively supplying a second oxidant flow to the second stage of the reformer; 7) routing fluid within the second stage of the reformer through a second portion of the catalyst bed; and 8) catalytically reacting the fluid within the second stage as the fluid within the second stage flows through the second portion of the catalyst bed.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

The autothermal reformer of the present invention may be further understood with reference to a typical system within which the autothermal reformer can be employed. Therefore, before further describing the invention, a general overview of a fuel cell system within which the autothermal reformer of the present invention can operate is provided.

However, it should be understood that the autothermal reformer of the present invention can operate in systems other than a fuel cell system and therefore the scope of the invention should not be limited to an autothermal reformer in a fuel cell system.

Figure 1:
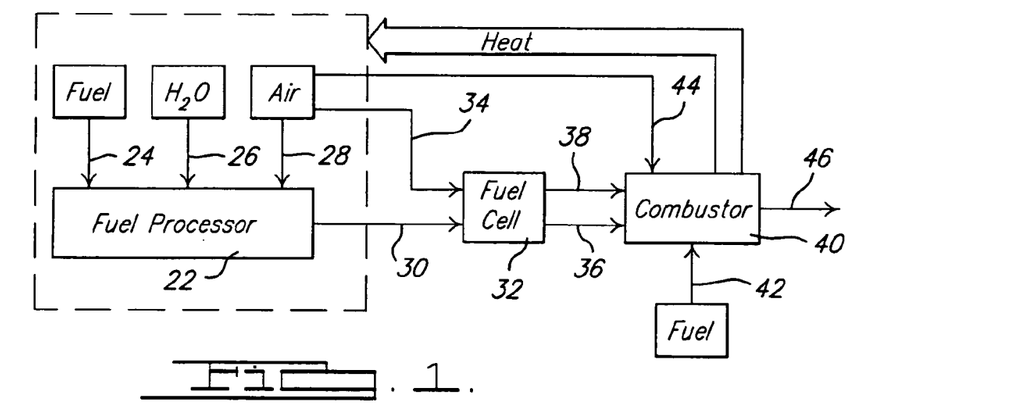
FIG. 1 is a schematic representation of a fuel cell system within which the autothermal reformer of the present invention can be employed.

In the system, a hydrocarbon fuel is processed in a fuel processor, for example, by reformation and preferential oxidation processes, to produce a reformate gas which has a relatively high hydrogen content on a volume or molar basis. As shown in FIG. 1, a fuel cell system 20 includes a fuel processor 22 for catalytically reacting a reformable fuel flow 24, water in the form of steam from a water flow 26, and an oxidant flow 28 in the form of oxygen ($O_2$) or air ($O_2$ mixed with $N_2$) in a combination preferential oxidation/steam reforming reaction. The fuel processor 22 contains one or more reactors wherein the reformable fuel in fuel flow 24 undergoes dissociation in the presence of steam in water flow 26 and an oxidant in oxidant flow 28 to produce the hydrogen-rich reformate which is exhausted from the fuel processor 22 in reformate flow 30. The fuel processor 22 typically also includes one or more downstream reactors, such as water gas shift and/or preferential oxidization reactors which are used to reduce the level of carbon monoxide in the reformate flow 30 to acceptable levels. The $H_2$ rich reformate flow 30 is fed through the anode chamber(s) of a fuel cell stack 32. At the same time, an oxidant, in the form of $O_2$ or air in oxidant flow 34 is fed into a cathode chamber(s) of the fuel cell stack 32. The hydrogen from the reformate flow 30 and the oxygen from the oxidant flow 34 react in the fuel cell stack 32 to produce electricity.

Anode exhaust or effluent 36 from the anode side of the fuel cell stack 32 may contain some unreacted hydrogen. The cathode effluent 38 from the cathode side of the fuel cell stack 32 may contain some unreacted oxygen. These unreacted gases represent additional energy which can be recovered in a combustor 40, in the form of thermal energy, for various heat requirements within the fuel cell system 20.

Specifically, a fuel flow 42 and/or anode effluent 36 can be combusted, catalytically or thermally, in the combustor 40 with oxygen provided to the combustor 40 from oxidant flow 44 and/or from the cathode effluent 38, depending upon system operating conditions. The combustor 40 discharges an exhaust flow 46 to the environment and the heat generated thereby may be directed to the fuel processor 22 as needed.

Figure 2:
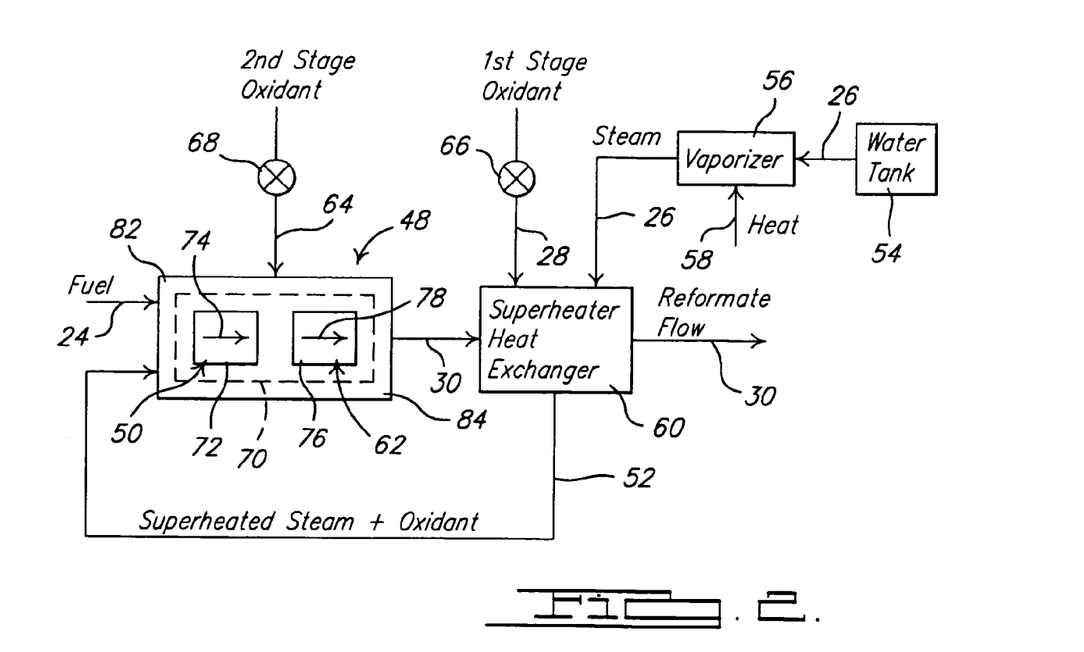
FIG. 2 is a schematic representation of a staged oxidant autothermal reformer according to the principles of the present invention.
Figure 3:
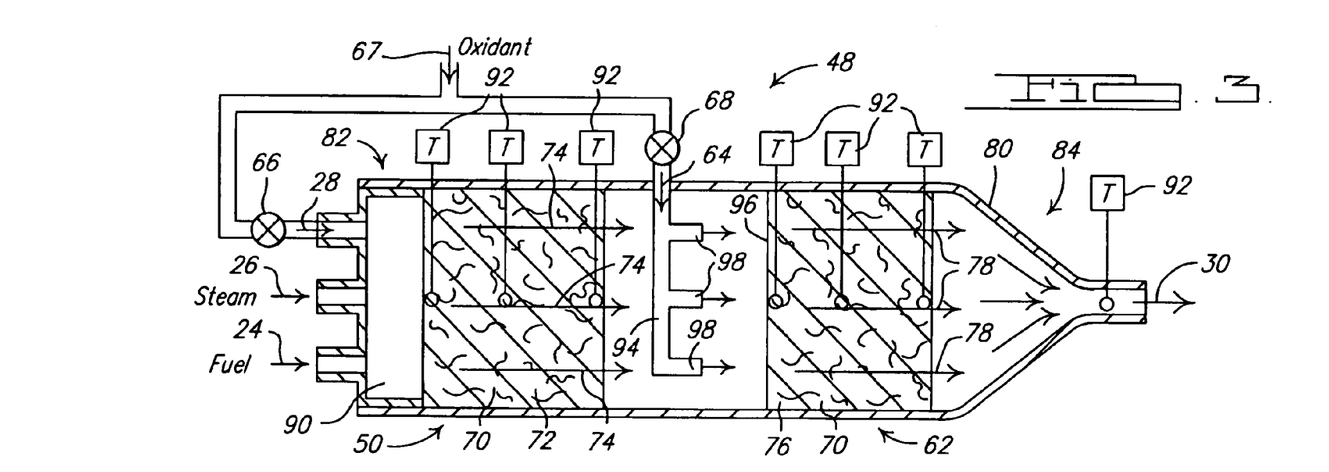
FIG. 3 is a simplified cross-sectional view of a staged oxidant autothermal reformer having two stages according to the principles of the present invention.
Figure 4:
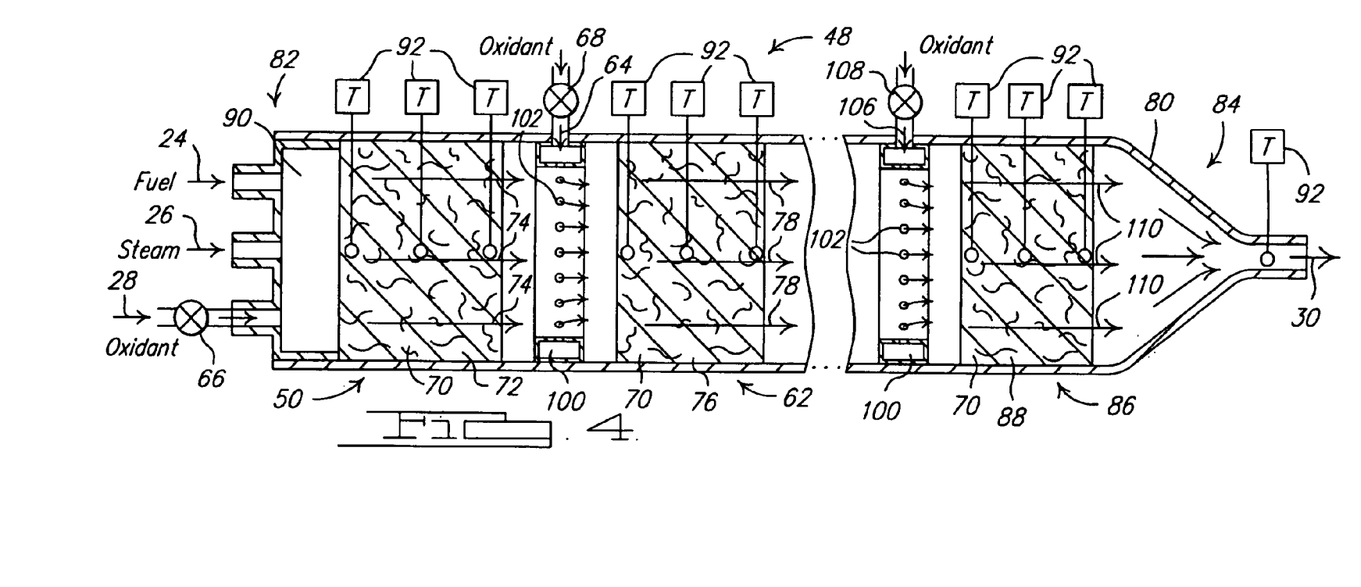
FIG. 4 is a simplified cross-sectional view of a staged oxidant autothermal reformer having a plurality of stages according to the principles of the present invention.

As stated above, the fuel processor 22 can have a number of components. The present invention relates to an autothermal reformer that can be a part of the fuel processor 22 for use in a fuel cell system 20 or, as is stated above, can be used as a means to produce a supply of $H_2$-rich reformate 30. Referring to FIG. 2, a schematic representation of an autothermal reformer 48 according to the principles of the present invention along with ancillary components that can be used to supply the reformer 48 with the necessary reactants is shown. A first stage 50 of the reformer 48 receives a fuel flow 24. The fuel flow 24 can come in a variety of forms. For example, the fuel flow 24 can be gasoline, methanol, ethanol, methane, natural gas, etc. The reformer 48 also receives the water flow 26, in the form of steam, and the oxidant flow 28. The water flow 26 and the oxidant flow 28 can be combined together into a single water/oxidant flow 52 or, as shown in FIGS. 3 and 4, the water flow 26, in the form of steam, and oxidant flow 28 can be separate flows that enter the first stage 50 of the reformer 48.

Preferably, the water flow 26 is in the form of superheated steam. The water flow 26 can be converted to steam by a number of methods. For example, the water flow 26 can originate from a water tank 54 and flow to a vaporizer 56. The vaporizer 56 heats the water flow 26 so that the water flow 26 is converted to steam. In order to do this, the vaporizer 56 receives a heat flow 58 that can come from a variety of sources, such as the combustor 40 or alternately from an electrical heater. The steam flow 26 can then be superheated by a heat exchanger 60. The superheater heat exchanger 60 can receive heat from a variety of sources. For example, the superheater heat exchanger 60 can extract heat from the hot reformate flow 30 that is exhausted by the reformer 48. Optionally, the oxidant flow 28 can mix with the steam flow 26 within the superheater heat exchanger 60 so that a superheated steam/oxidant flow 52 is exhausted from the superheater heat exchanger 60 and supplied to the first stage 50 of the reformer 48.

The oxidant flow 28 can come from a variety of sources. For example, as is stated above, the oxidant flow 28 can be $O_2$ or air. Preferably, the oxidant flow 28 is provided via a compressor (not shown) that provides the oxidant flow and can meet the demands of the reformer 48 and the system within which the reformer 48 is employed. Depending upon the specifications of the reformer 48 and/or the system within which the reformer 48 is employed, the air that is used in the oxidant flow 44 can originate from the ambient environment within which the reformer 48 is located.

A second stage 62 of the reformer 48 also receives an oxidant flow 64. Again, the oxidant flow 64, like the oxidant flow 28, can be comprised of pure $O_2$ or air. The oxidant flow 64 can be provided by the compressor (not shown) or can be drawn from the ambient environment within which the reformer 48 is located. The oxidant flow 28 and the oxidant flow 64 can be provided from different sources or originate from different areas, as shown in FIGS. 2 and 4, or, as shown in FIG. 3, can come from a common oxidant flow 67 that may or may not originate from a compressor, dependant upon the needs of the reformer 48. In order to facilitate the discussion of the reformer 48 and the supplying of a plurality of oxidant flows 28, 64 to the reformer 48, the oxidant flow 28 that flows to the first stage 50 of the reformer 48 will hereinafter be referred to as a first oxidant flow 28 and the oxidant flow 64 that flows to the second stage 62 of the reformer 48 will be referred to as a second oxidant flow 64. Preferably, there are first and second control valves 66, 68 that control the respective first and second oxidant flows 28, 64. The first and second control valves 66, 68 control the volumetric flow rate of oxidant that flows through the control valves 66, 68 and into the respective first and second stages 50, 62 of the reformer 48. The control valves 66, 68 thereby regulate the amount of oxidant received by each stage of the reformer 48, as will be discussed in more detail below.

The reformer 48 has a catalyst bed 70 that is comprised of a plurality of portions. Each stage of the reformer 48 will contain a different portion of the catalyst bed 70. The superheated steam/oxidant flow 52 and the fuel flow 24 flow into the first stage 50 of the reformer 48 and through a first portion 72 of the catalyst bed 70, wherein a combination preferential oxidation/steam reforming reaction begins. The fluids flowing through the first portion 72 of the catalyst bed 70 are referred to as a first stage flow 74. The first stage flow 74 flows through the first portion 72 of the catalyst bed 70 and into the second stage 62. The first stage flow 74 mixes with the second oxidant flow 64 within the second stage 62 and passes through a second portion 76 of the catalyst bed 70. The fluids flowing through the second portion 76 of the catalyst bed 70 are referred to as a second stage flow 78. The second stage flow 78 are then exhausted from the reformer 48 in the form of reformate flow 30. The reformate flow 30, as was discussed above, can then flow through the superheater heat exchanger 60, if desired, and then on to any subsequent downstream components of the system (such as a water gas shift and/or preferential oxidization reactors) to reduce the level of carbon monoxide and form the reformate flow 30.

Referring now to FIG. 3, a simplified cross-sectional view of a reformer 48 according to the principles of the present invention is shown. The reformer 48 has a casing 80 that extends between an upstream side 82 and a downstream side 84. The reformer 48 has a plurality of stages between the upstream and downstream sides 82, 84. For example, as shown in FIG. 3, the reformer 48 has a first stage 50 and a second stage 62. However, it should be understood that the reformer 48 can have more than two stages. For example, as shown in FIG. 4, the reformer 48 can have an $n^{th}$ stage 86, where n represents any whole integer greater than two. Each stage of the reformer 48 contains a different portion of the catalyst bed 70. Therefore, the $n^{th}$ stage 86 contains an $n^{th}$ portion 88 of the catalyst bed 70.

While the reformer 48 is shown and discussed as containing a plurality of stages with each stage containing a portion of the catalyst bed 70, it should be understood that additional stages can be provided in the reformer 48 with or without a portion of the catalyst bed 70 and still be within scope of the invention as defined by the claims. For example, the reformer 48 can have additional reformate processing steps integrated into the reformer, such as a water gas shift reactor and a preferential oxidization reactor, and/or additional components of the system, such as the superheater heat exchanger 60, and still be within the scope of the invention. Therefore, it should be understood that the depictions and discussions of the reformer 48 are simplified to illustrate and explain the present invention without undue complication.

The fuel flow 24, the steam flow 26, and the first oxidant flow 28, preferably, mix together to form the first stage flow 74 prior to entering the first portion 72 of the catalyst bed 70. It should be understood that the mixing of the fuel, steam and first oxidant flows 24, 26, 28 can be performed in a variety of ways, as will be apparent to those skilled in the art, and still be within the scope of the invention. For example, the steam flow 26 and the first oxidant flow 28 can be mixed together prior to flowing to the first stage 50, as shown in FIG. 2. Alternatively, fuel, steam and first oxidant flows 24, 26, 28 can mix together in a mixing chamber 90 within the reformer 48 prior to flowing into the first portion 72 of the catalyst bed 70. Optionally, the mixing chamber 90 could contain a mixing medium (not shown) that provides for a tumultuous path through the mixing medium and causes the flows 24, 26, 28 to thoroughly mix and form the first stage flow 74 prior to entering the first portion 72 of the catalyst bed 70.

The first stage flow 74 passes through the first portion 72 of the catalyst bed 70. The catalyst bed 70 can be comprised of a plurality of individually discrete catalytic portions, or, alternatively, can be formed from a continuous catalyst that extends along the length of the reformer 48 through each of the stages and has openings for the insertion of additional oxidant flows into the reformer and still be within the scope of the invention as defined by the claims. Preferably, the catalyst bed 70 is comprised of a metallic or ceramic support coated with a catalyst washcoat formulation suitable for the reforming of a fuel into $H_2$, CO, $CO_2$, $CH_4$ and $H_2O$. One example of such a catalyst bed would include a cordierite (ceramic) honeycomb monolith coated with a platinum group metal (PGM)-containing washcoat.

Preferably, the reformer 48 has a plurality of temperature measuring devices 92, as shown in FIGS. 3 and 4, that are spaced throughout the reformer 48 along its length. The temperature measuring devices can come in a variety of forms, as will be apparent to those skilled in the art. For example, the temperature measuring devices 92 can be thermocouples, or temperature probes that are positioned throughout the reformer 48. The temperature measuring devices 92 are used to measure and monitor the temperature within the reformer 48 at various locations within the reformer 48. For example, each portion 72, 76 of the catalyst bed 70 can have three temperature measuring devices 92 positioned along its length to measure the respective temperatures of the first and second portions 72, 76 of the catalyst bed 70 and/or the respective temperatures of the first and second stage flows 74, 78.

The first stage flow 74 passes through the first portion 72 of the catalyst bed 70 wherein catalytic partial oxidation and/or steam reforming occurs depending upon the operating conditions of the reformer 48, as will be explained in more detail below. The first stage flow 74 then passes to the second stage 62 of the reformer 48. The second stage 62 also receives the second oxidant flow 64. The second oxidant flow 64 can be injected into the second stage 62 in a variety of ways, as will be apparent to those skilled in the art. For example, as shown in FIG. 3, the second oxidant flow 64 can flow into a distribution rack 94 that extends across a cross-sectional area on an upstream side 96 of the second portion 76 of catalyst bed 70. The distribution rack 94 has a plurality of openings 98 that are spaced along the distribution rack 94 so that the second oxidant flow 64 is distributed evenly along the upstream side 96 of the second portion 72 of the catalyst bed 70. Alternatively, as shown in FIG. 4, the second oxidant flow 64 can flow into an annular chamber 100 that extends around the periphery of the reformer 48. The annular chamber 100 has a plurality of opening 102 that are spaced around the perimeter of the annular chamber 100 and allow the second oxidant flow 64 to be injected into the second stage 62 of the reformer 48 up stream of the second portion 76 of the catalyst bed 70. Other methods of distributing the second oxidant flow 64 across the upstream side 96 of the second portion 72 of the catalyst bed 70 can also be employed, as will be apparent to those skilled in the art, and still be with in the scope of the invention as defined by the claims.

The first stage flow 74 mixes with the second oxidant flow 64 to form the second stage flow 78 that passes through the second portion 76 of the catalyst bed 70. The second portion 76 of the catalyst bed 70 can be made from the same materials as the first portion 72. The second stage flow 78 further reacts as it passes through the second portion 76 of the catalyst bed 70 to form the reformate flow 30 that is exhausted from the downstream side 84 of the reformer 48.

The second stage 62 of the reformer 48 can also have a plurality of temperature measuring devices 92 that allow the monitoring of the temperature along the length of the second portion 76 of the catalyst bed 70 and/or the temperature of the second flow 78. Preferably, there is also a temperature measuring device 92 that can measure the temperature of the reformate flow 30 being exhausted from the downstream side 84 of the reformer 48.

As can be seen in FIG. 4, when the reformer 48 has an $n^{th}$ stage 86, there will be an $n^{th}$ oxidant flow 106 that is supplied to the reformer 48, via an $n^{th}$ control valve 108, upstream of the $n^{th}$ portion 88 of the catalyst bed 70. The $n^{th}$ oxidant flow 106 mixes with the $(n-1)^{th}$ stage flow (not shown) to form the $n^{th}$ stage flow 110. The $n^{th}$ stage flow 110 passes through the $n^{th}$ portion 88 of the catalyst bed 70 wherein the $n^{th}$ stage flow 110 further reacts to form the reformate flow 30 that is exhausted from the downstream side 84 of the reformer 48.

The operation of the reformer 48 in accordance with the principles of the present invention will now be discussed. The operation of the reformer 48 will be separated into a discussion of operating the reformer 48 during a startup condition, when steam is not available, and operation of the reformer 48 during a normal condition, when steam is readily available.

The startup condition is defined by the lack or limited availability of water in the form of steam to be supplied to the reformer 48. This typically occurs when the system within which the reformer 48 is employed is in a startup condition or operated at a very low temperature. The water flow 26 that is vaporized into steam in a vaporizer 56 typically uses a heat flow 58 that is generated somewhere else in the system within which the reformer 48 is employed. Because the heat flow 58 may be insufficient to provide an adequate supply of steam to the reformer 48 during the startup condition, the reformer 48 will be operated differently during the lack of an adequate supply of steam than when the reformer 48 has an adequate supply of steam.

During the startup operation of the reformer 48, the first stage 50 is supplied with the fuel flow 24 and the first oxidant flow 28. The amount of fuel being supplied to the reformer 48 in the fuel flow 24 is a known quantity that is controlled. The amount of oxidant flowing into the first stage 50 via the first oxidant flow 28 is also a known quantity and is controlled by the first control valve 66. The amount of oxidant supplied to the first stage 50 via the first oxidant flow 28 will vary depending upon a number of factors. For example, the amount of oxidant flowing into the first stage 50 of the reformer 48 can be based upon the type and amount of fuel flowing into the first stage 50, the temperature throughout the reformer 48, the availability of steam, and other factors, as will be apparent to those skilled in the art. For example, as was stated above, when there is a lack of steam flowing to the reformer 48, the formation of carbon is a major concern. Therefore, the amount of oxidant flowing to the first stage 50 of the reformer 48 can be adjusted so that the O/C ratio is sufficient to prevent carbon formation. For example, the amount of oxidant within the first oxidant flow 28 can be adjusted so that an O/C ratio of 1.1 or more is attained throughout the reformer 48. However, in the present invention it is not necessary to supply the entire amount of oxidant required to have an O/C ratio sufficient to prevent carbon formation via the first oxidant flow 28. This is because the present invention has a second oxidant flow 64 that is introduced into the reformer 48 downstream from the first stage 50 that can also be used to prevent carbon formation. As is known in the art, the reaction of the fuel flow 24 with the oxidant contained within the reformer 48 will occur throughout the length of the reformer 48. Therefore, the entire amount of oxidant does not need to be supplied via the first oxidant flow 28 to prevent the carbon formation within the reformer 48. By regulating the amount of oxidant supplied to the reformer 48 via the first and second oxidant flows 28, 64, the prevention of carbon formation can be attained without requiring all of the oxidant to be fed to the reformer 48 via the first oxidant flow 28.

Additionally, as was also stated above, the catalytic partial oxidation reaction that occurs within the reformer 48 when there is an insufficient amount of steam is exothermic and can generate extremely high temperatures within the reformer 48. Therefore, the amount of oxidant flowing to the first stage 50 of the reformer 48 via the first oxidant flow 28 can be adjusted so that the temperature within the first stage 50 does not exceed a predetermined maximum temperature, drop below a predetermined minimum temperature, and/or operates between predetermined maximum and minimum temperatures. These maximum and minimum temperatures will vary depending upon the physical design of the reformer 48. For example, the maximum and minimum temperatures will vary depending upon the materials out of which the reformer 48 is made, the materials out of which the catalyst bed 70 is made, and the heat withstanding characteristics of various other ancillary components that are associated with the reformer 48.

Therefore, during the startup of the reformer 48, the amount of oxidant that flows into the first stage 50 via the first oxidant flow 28 can be controlled by the first control valve 66 to prevent a temperature in the first stage 50 from exceeding a predetermined magnitude so that no damage is caused to the reformer 48. Alternatively, and/or additionally, the amount of oxidant flowing to the second stage 62 via the second oxidant flow 64, can be controlled by the second control valve 68 so that the temperature in the second stage 62 also does not exceed a predetermined magnitude and no damage is caused to the second stage 62 of the reformer 48. Depending on the construction of the reformer 48, the maximum allowable temperatures within the first stage 50 and the second stage 64 and any subsequent $n^{th}$ stage 86 can vary and do not need to be the same maximum temperatures.

The amount of oxidant flowing into the reformer 48 via the first oxidant flow 28 and via the second oxidant flow 64 can also be controlled so that a maximum temperature within the first stage 50 is generally the same as a maximum temperature that occurs in the second stage 62. That is, the amount of oxidants can be adjusted so that both the first and second stages 50, 62 experience generally the same maximum temperature.

Figure 5:
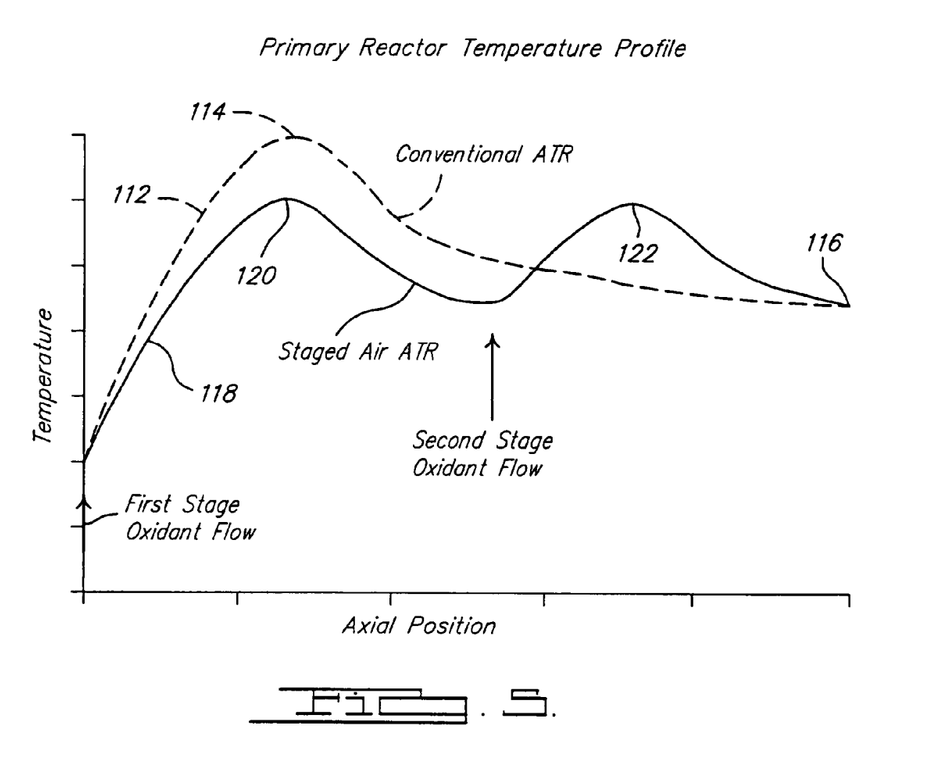
FIG. 5 is a graphical representation of a possible temperature profile of a staged oxidant autothermal reformer according to the principles of the present invention.

Referring now to FIG. 5, a temperature profile along an axial length of the reformer 48 is shown for a reformer according to the principles of the present invention and for a conventional reformer. The temperature profile for a conventional reformer is shown as dotted line 112. The conventional reformers are characterized by introducing the oxidant in only a single area relative to the length of the reformer. As can be seen, the conventional temperature profile 112 quickly increases to a maximum temperature 114 and then gradually decays to a lower outlet temperature 116 at the end of the axial length of the reformer. As the temperature profile 112 shows, the majority of the heat is concentrated in an upstream portion of the reformer such that a potential for temperature damage to occur is the greatest in the upstream location just downstream of where the oxidant is supplied to the reformer.

In contrast, the reformer 48 of the present invention stages the introduction of the oxidant along its axial length by providing separate first and second oxidant flows 28, 64 that are introduced in various stages along the axial length of the reformer 48. A typical temperature profile of a reformer 48 made according to the principles of the present invention is shown by the solid line 118. As can be seen, the temperature profile 118 has two temperature rises or peaks 120, 122 that are associated with the respective first and second stages 50, 62 and occur slightly downstream from the axial location where the respective first and second oxidant flows 28, 64 are introduced in the reformer 48. That is, the first oxidant flow 28, which is presumably less than the quantity of oxidant supplied to the prior art reformer, is introduced into the upstream side of the first stage 50 and, as a result, the temperature profile within the first stage 50 of the reformer 48 increases less rapidly than the temperature within a prior art reformer and then reaches a peak or maximum temperature 120 that is lower than the maximum temperature 114 of a conventional reformer. The temperature profile within the first stage 50 then decays to a lower temperature as it exits the first stage 50. The temperature profile 118 then begins to increase again at the location where the second oxidant flow 64 flows into the second stage 62 of the reformer 48. The temperature profile 118 then steadily increases along the axial length of the second stage 62 and reaches a second maximum temperature 122, which in this case is approximately equal to the first maximum temperature 120. Again, after the second maximum temperature 122 is achieved, the temperature within the second stage 62 begins to decay and reaches a final outlet temperature 116 which represents the temperature of the reformate flow 30 being exhausted from the reformer 48.

While the graph in FIG. 5 shows a temperature profile 118 for the reformer 48 that receives first and second oxidant flows 28, 64 that are axially staged apart, it should be understood that when the reformer 48 has more than two stages, the temperature profile 118 will have additional peaks associated with each location of an oxidant being supplied to the reformer 48. As will be apparent to those skilled in the art, the axial positioning of the oxidant flows that are supplied to the reformer 48 will change the distance between the first and second maximum temperatures 120, 122 along with the slopes of the temperature profile 118. It should also be apparent that the amount of oxidant that is introduced into the reformer 48 via the first and second oxidant flows 28, 64 will determine the maximum temperatures 120, 122 that will occur within the reformer 48 and will also effect the minimum temperatures that occur throughout the reformer 48 and the outlet temperature of the reformate flow 30.

It should be understood that the principles discussed and associated with the staging of the oxidant flow to the reformer 48 into first and second oxidant flows 28, 64 that are axially spaced apart along the reformer 48 are equally applicable to staging any number of oxidant flows along the length of the reformer 48 such that a temperature profile throughout the reformer 48 according to the principles of the present invention can be controlled by controlling the amount and location of the oxidant flows that are supplied to the various stages of the reformer 48. Additionally, it should also be understood that the principles associated with ensuring that an O/C ratio within the reformer 48 is sufficient to prevent carbon formation is also equally applicable to where the reformer 48 has more than two stages and more than two oxidant flows.

Therefore, it should be understood that the amount of oxidant being supplied to the reformer 48 via the first, second and $n^{th}$ oxidant flows 28, 64, 106 can be controlled so that a predetermined maximum temperature is not exceeded in any location within the reformer 48, so that the temperature throughout the reformer 48 does not go below a predetermined minimum temperature, so that an average temperature throughout the length of the reformer 48 is within a desired range or generally equal to a predetermined magnitude, and so that the temperature of the reformate flow 30 exiting the reformer 48 is a predetermined temperature.

During the startup, the supply of steam to the reformer 48 will increase as the system within which the reformer 48 continues its startup. As more steam flow 26 enters the reformer 48, the amount of oxidant flowing into the reformer 48 via the first and second oxidant flows 28, 64 can be reduced. The reduction in the amount of oxidant that flows into the reformer 48 as a result of the increase of the amount of steam flow 26, is preferably controlled so that the O/C ratio within the reformer 48 remains sufficient to prevent carbon formation. That is, as more oxygen in the form of steam molecules becomes available, the amount of oxidant flow can be decreased so that the overall reactions occurring within the reformer 48 do not allow carbon to be formed. The amount of steam being supplied to the reformer 48 via the steam flow 26 will increase as the system within which the reformer 48 continues its startup operation and progresses towards its normal operating conditions. Once the steam received by the reformer 48 via the steam flow 26 reaches a desired, or standard flow, the reformer 48 will change from being run in a startup mode to being run in its normal operating mode.

During normal operation, the reformer 48 is supplied with the fuel flow 24, the steam flow 26, and a first oxidant flow 28 that is supplied to the first stage 50. The reformer 48 also continues to receive the second oxidant flow 64 which is introduced into the second stage 62. The first stage flow 74, which contains the fuel flow 24, the steam flow 26 and the first oxidant flow 28, is routed through the first portion 72 of the catalyst bed 70 wherein the first stage flow 74 catalytically reacts in the first portion 72 of the catalyst bed 70 and undergoes a steam reforming reaction along with a catalytic partial oxidation. The first stage flow 74 then enters the second stage 62 and combines with the second oxidant flow 64 to form the second stage flow 78. The second stage flow 78 then proceeds through the second portion 76 of the catalyst bed 70 where further steam reforming and catalytic partial oxidation occurs. The second stage flow 78 exits the second portion 76 of the catalyst bed 70 and is exhausted from the reformer 48 in the form of reformate flow 30.

The amount of oxidant flowing to the reformer 48 via the first and second oxidant flows 28, 64 can be controlled via the first and second control valves 66, 68 so that the temperature in the first stage 50 does not exceed a predetermined magnitude and the temperature within the second stage 62 also does not exceed a predetermined magnitude. As was stated above, the predetermined magnitudes of a maximum temperature within the first and second stages 50, 62, can be the same, or, can be different depending upon the construction of the reformer 48 and the desired operation of the reformer 48. For example, the oxidant flows can be controlled so that the temperature of the reformate flow 30 is generally of a predetermined magnitude. The magnitude of the temperature of the reformate flow 30 will vary depending upon the needs of the system within which the reformer 48 is employed along with the composition of the reformer 48 and the type of fuel that is supplied to the reformer 48 via the fuel flow 24.

The amount of oxidant that enters the reformer 48 via the first and second oxidant flows 28, 64 can also be controlled so that an average temperature within the first stage 50 is generally of a predetermined magnitude and an average temperature within the second stage 62 is also of a generally predetermined magnitude. Again, the magnitudes of the temperatures within the first and second stages 50, 62 can differ depending upon the desired operation of the reformer 48 and the needs of the system within which the reformer 48 is employed. The oxidant flows 28, 64 can also be controlled so that the average temperature within the respective first and second stages 50, 62 exceed a predetermined average magnitude. Therefore, it should be understood that a desired temperature profile within the reformer 48 can be attained by regulating the oxidant flows that are supplied to the various stages of the reformer 48.

By controlling the temperature profile within the reformer 48, a more efficient autothermal reforming operation can occur. For example, by increasing the temperature in the second stage 62 over that of conventional reformers, the amount of steam reforming and/or catalytic partial oxidation that occurs in the second stage 62 will increase such that a more efficient use of the catalyst bed 70 can be achieved. That is, by increasing the temperature of the second portion 76 of the catalyst bed 70, more reaction will be occurring in the second portion 76 of the catalyst bed 70 than would be occurring in a conventional reformer.

Additionally, the staging of the oxidant being supplied to the reformer 48 can also benefit the operation of the reformer 48 during differing power levels for the system within which the reformer 48 is employed. For example, at a low power operation of the system within which the reformer 48 is employed, heat loss may become more significant and by injecting more oxidant into the second stage 62 via the second oxidant flow 64, the temperature of the second stage flow 78 and/or the reformate flow 30 can be increased so that a sufficient amount of heat is provided to the system by the reformate flow 30 and enables a more efficient operation of the system when operating in a low power level.

By staging the oxidant that is supplied to the reformer 48 via the first and second oxidant flows 28, 64, the time required to startup the reformer 48 can be decreased. The startup of conventional reformers is most dependent upon the time required to heat the reformer to a temperature where the heat of the reformate flow 30 is sufficient to generate steam and/or superheated steam to be supplied to the reformer 48. By staging the oxidant being supplied to the reformer 48 along its axial length, the average temperature in the reformer 48 can be increased, without the risk of carbon formation or temperature damage, and provide for a reformate flow 30 that has a higher temperature so that steam can be available to be supplied to the reformer 48 more quickly. Therefore, the staging of the oxidant flowing into the reformer 48 can decrease the startup time.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of starting-up an autothermal reformer, the method comprising:

initiating a start-up operation of the autothermal reformer wherein a sufficient supply of steam for steam reforming a hydrocarbon fuel is currently unavailable to be supplied to the autothermal reformer, the start-up operation including:

forming a first stage flow having a fuel flow and a first oxidant flow;

passing said first stage flow through a first stage of a catalyst bed of a primary reactor, said catalyst bed being at a temperature below a predetermined operating temperature and catalytically reacting said first stage flow within said first stage to form a first stage effluent including $H_2$, CO, $CO_2$, and unburned fuel;

forming a second stage flow having said first stage effluent and a second oxidant flow; and passing said second stage flow through a second stage of said catalyst bed of said primary reactor and catalytically reacting said second stage flow including all of said unburned fuel within said second stage to form a reformate flow which is exhausted from said second stage.

2. The method of claim 1, wherein forming a first stage flow includes controlling a quantity of oxidant that flows into said first stage via said first oxidant flow so that a temperature in said first stage does not exceed a first predetermined magnitude and carbon is not formed in said first stage.

3. The method of claim 2, wherein said step of forming said second stage flow includes controlling a quantity of oxidant that flows into said second stage via said second oxidant flow so that a temperature in said second stage does not exceed a second predetermined magnitude and carbon is not formed in said second stage.

4. The method of claim 1, further comprising the step of adjusting a flow of at least one of said first and second oxidant flows so that a magnitude of a temperature spike in said first stage is generally equal to a magnitude of a temperature spike in said second stage.

5. The method of claim 1, wherein said step of forming said second stage flow includes controlling a quantity of oxidant that flows into said second stage via said second oxidant flow so that a temperature at an outlet of said second stage is generally equal to a predetermined magnitude.

6. The method of claim 1, wherein said step of forming said second stage flow includes dispersing said second oxidant flow generally evenly across an upstream face of said second stage.

7. The method of claim 1, wherein said steps of forming said first and second stage flows include controlling a quantity of oxidants that flow into said first and second stages via said first and second oxidant flows so that carbon is not formed within the reformer.

8. The method of claim 1, wherein said steps of forming first and second stage flows include controlling a quantity of oxidants that flow into said first and second stages via said first and second oxidant flows so all carbon is exhausted from the primary reactor in the form of at least one of CO, $CO_2$, and $CH_4$.

9. The method of claim 1, further comprising transitioning from said start-up operation to normal operation wherein steam reforming is the main reaction in said primary reactor by selectively supplying a steam flow to the reformer as a sufficient supply of steam becomes available from a system within which the reformer is employed and reducing an amount of oxidant flowing into the reformer via said first and second oxidant flows as said steam flow supplied to the reformer increases to said sufficient quantity.

10. A method of starting-up an autothermal reformer, the method comprising:
  initiating a start-up operation of the autothermal reformer wherein an adequate supply of steam for supporting steam reforming of a hydrocarbon fuel within the autothermal reformer is not currently available to be supplied to the autothermal reformer, the start-up operation including:
  forming a first stage flow having a fuel flow, a first oxidant flow and a steam flow;
  passing said first stage flow through a first stage of a catalyst bed of a primary reactor, said catalyst bed being at a temperature below a predetermined operating temperature, and catalytically reacting said first stage flow within said first stage to form a first stage effluent;
  forming a second stage flow having said first stage effluent and a second oxidant flow; and
  passing said second stage flow through a second stage of said catalyst bed of said primary reactor and catalytically reacting said second stage flow within said second stage to form a reformate flow which is exhausted from said second stage.

11. The method of claim 10, wherein:
  forming a first stage flow includes controlling a quantity of oxidant that flows into said first stage via said first oxidant flow so that a temperature in said first stage does not exceed a first predetermined magnitude and carbon is not formed in said first stage; and
  forming a second stage flow includes controlling a quantity of oxidant that flows into said second stage via said second oxidant flow so that a temperature in said second stage does not exceed a second predetermined magnitude and carbon is not formed in said second stage.

12. The method of claim 10, wherein forming a second stage flow includes controlling a quantity of oxidant that flows into said second stage via said second oxidant flow so that a temperature of said reformate flow is generally of a predetermined magnitude.

13. The method of claim 10, wherein forming a second stage flow includes controlling a quantity of oxidant that flows into said second stage via said second oxidant flow so that an average temperature in said second stage exceeds a predetermined magnitude.

14. The method of claim 10, wherein forming said first and second stage flows include controlling a quantity of oxidants that flow into said first and second stages via said first and second oxidant flows so that an average temperature within the reformer exceeds a predetermined magnitude.

15. The method of claim 10, wherein forming said first and second stage flows include controlling a quantity of oxidant that flows into said first and second stages via said first and second oxidant flows so that carbon is not formed within the reformer.

16. The method of claim 10, further comprising transitioning from said start-up operation to a normal operation wherein steam reforming is the main reaction in said primary reactor by increasing a quantity of steam flow forming said first stage flow as an adequate supply of steam becomes available and decreasing a quantity of said first and second oxidant flows being supplied to said primary reactor.

17. A method of operating an autothermal reformer comprising:
  (a) operating the autothermal reformer in a start-up regime when an available supply of steam to the autothermal reformer is limited to a quantity that prevents normal operation of the autothermal reformer, operating the autothermal reformer in a start-up regime including:
    (i) forming a first stage flow having a fuel flow and a first oxidant flow;
    (ii) passing said first stage flow through a first stage of a catalyst bed of a primary reactor of the autothermal reformer and catalytically reacting said first stage flow within said first stage to form a first stage effluent;
    (iii) forming a second stage flow having said first stage effluent and a second oxidant flow;
    (iv) passing said second stage flow through a second stage of said catalyst bed of said primary reactor and catalytically reacting said second stage flow within said second stage to form a reformate flow which is exhausted from said second stage; and (v) controlling a quantity of oxidant supplied to said primary reactor in said first and second stage flows so that carbon is not formed in the primary reactor and a temperature of said primary reactor does not exceed a predetermined magnitude.

18. The method of claim 17, further comprising:
(b) transitioning to a normal operation of the autothermal reformer as said available supply of steam increases in quantity, said transition to normal operation including:
  (i) supplying a steam flow to said first stage of said primary reactor of said autothermal reformer;
  (ii) increasing a quantity of steam flowing to said first stage of said primary reactor as additional steam becomes available; and
  (iii) decreasing a quantity of oxidant supplied to said primary reactor in said first and second oxidant flows as said quantity of steam flowing to said primary reactor increases.

19. The method of claim 18, further comprising preventing the formation of carbon in the primary reactor and maintaining a temperature of said primary reactor below a predetermined value during the transitioning operation.

20. The method of claim 18, further comprising commencing normal operation of the autothermal reformer when a sufficient supply of steam is available to be feed into said primary reactor.

* * * * *